US012692347B2

(12) United States Patent
Quinebeche et al.

(10) Patent No.: US 12,692,347 B2
(45) Date of Patent: Jul. 28, 2026

(54) METHOD FOR THE CONTINUOUS PREPARATION OF FORMULATED POLYAMIDE PREPOLYMERS

(71) Applicant: ARKEMA FRANCE, Colombes (FR)

(72) Inventors: Sébastien Quinebeche, Serquigny (FR); Gérald Romazini, Serquigny (FR); Pierrick Roger-Dalbert, Pierre-Benite (FR); Thierry Briffaud, Serquigny (FR)

(73) Assignee: ARKEMA FRANCE, Puteaux (FR)

( * ) Notice: Subject to any disclaimer, the term of this patent is extended or adjusted under 35 U.S.C. 154(b) by 666 days.

(21) Appl. No.: 18/251,790

(22) PCT Filed: Nov. 10, 2021

(86) PCT No.: PCT/FR2021/051987
§ 371 (c)(1),
(2) Date: May 4, 2023

(87) PCT Pub. No.: WO2022/101580
PCT Pub. Date: May 19, 2022

(65) Prior Publication Data
US 2023/0407006 A1 Dec. 21, 2023

(30) Foreign Application Priority Data

Nov. 12, 2020 (FR) ...................................... 2011600

(51) Int. Cl.
*C08G 69/10* (2006.01)
*C08J 3/21* (2006.01)
(52) U.S. Cl.
CPC .............. *C08G 69/10* (2013.01); *C08J 3/212* (2013.01); *C08J 2377/04* (2013.01)
(58) Field of Classification Search
CPC ........ C08G 69/28; C08G 69/03; C08G 69/10; C08J 3/212
See application file for complete search history.

(56) References Cited

U.S. PATENT DOCUMENTS

| | | | |
|---|---|---|---|
| 8,765,902 B2 | 7/2014 | Desbois et al. | |
| 9,453,107 B2 | 9/2016 | Lagneaux et al. | |
| 2013/0131305 A1 | 5/2013 | Häffner | |
| 2015/0191569 A1* | 7/2015 | Lagneaux .............. | C08G 69/28 |
| | | | 528/335 |

FOREIGN PATENT DOCUMENTS

| | | |
|---|---|---|
| CN | 104530421 A | 4/2015 |
| EP | 0410650 A1 | 1/1991 |
| EP | 2877516 B1 | 4/2018 |
| JP | H0381326 A | 4/1991 |
| JP | 2001200052 A | 7/2001 |
| JP | 2009203422 A | 9/2009 |
| JP | 2015522703 A | 8/2015 |
| JP | 2016528312 A | 9/2016 |

OTHER PUBLICATIONS

Eichhorn, K.J. et al., "Characterization of Low Molecular Weight Carboxyl-Terminated Polyamides Obtained by Reactive Extrusion of Polyamide 6 with Trimellitic Anhydride", Journal of Applied Polymer Science, vol. 62, No. 12, Dec. 19, 1996, pp. 2053-2060, John Wiley & Sons, Inc., US. (8 pages).
International Search Report (PCT/ISA/210) and Written Opinion (PCT/ISA/237) mailed on Feb. 18, 2022 by the European Patent Office as the International Searching Authority for International Application No. PCT/FR2021/051987. (13 pages).
Notice of Reasons for Rejection (with English translation) issued on Dec. 2, 2025, by Japan Patent Office (JPO), in Japanese Patent Application 2023-527661, 10 pages.

* cited by examiner

*Primary Examiner* — Gregory Listvoyb
(74) *Attorney, Agent, or Firm* — Boone IP Law

(57) ABSTRACT
A method for continuously preparing a formulated polyamide prepolymer, of which the solution viscosity is from 0.25 dL/g to 0.70 dL/g, as measured according to ISO 307:2007 in m-cresol at 20° C., the method including a step of polycondensation on the basis of one or more polyamide precursor monomers, said polycondensation step being carried out in an extruder comprising at least two co-rotating conveying screws, the at least one monomer being previously fed therein in solid or liquid form without being dissolved in a solvent or in water, and said polycondensation step being carried out without extraction of the water formed during said polycondensation step and comprising the addition of at least one additive during said polycondensation step in the extruder.

15 Claims, No Drawings

METHOD FOR THE CONTINUOUS PREPARATION OF FORMULATED POLYAMIDE PREPOLYMERS

TECHNICAL FIELD

The present patent application relates to a method for the continuous preparation of formulated polyamide prepolymers, by polycondensation, as well as extruders suitable for implementing such a method.

PRIOR ART

Polyamides (PA) are conventionally prepared by polycondensation of a diamine with a dicarboxylic acid, or an amino acid, or else a lactam, in a reactor by a batch method in which the monomers are added and heated under pressure until a mixture of sufficient viscosity is obtained. The monomers are frequently added in aqueous solution and the water present and/or formed during the polycondensation must be removed by placing the reactor under reduced pressure.

However, the molar mass of the polyamide is difficult to control/manage due to its "living" nature because during the emptying of the reactor, the product may not have the same molar mass (the same viscosity) at the start and at the end of the emptying of the reactor.

If the targeted molar mass is exceeded, it is no longer possible to go back, and the product is "declassified" for the entire batch produced.

Furthermore, the batch method is a more capital intensive method (for a quantity of product manufactured annually) and less ecological (more energy and water consumption, more production of gaseous effluent and waste, etc.).

Furthermore, the removal of water frequently also leads to a loss of the monomers added, especially in the case of the polycondensation of diamines with dicarboxylic acids, which requires working with an excess of monomers and therefore causes an added cost for the method.

More recently, methods for continuous synthesis have been developed.

Thus, patent EP 2,877,516 describes a method for the continuous synthesis of polyamide with a weight average molecular weight (Mw) of greater than or equal to 14,000 g/mol. This method requires at least two water discharge operations and leads not to prepolymers but to polymers.

U.S. Pat. No. 8,765,902 describes a method for the continuous preparation of 6T/6I copolyamide. This method requires the evaporation of the water and does not lead to prepolymers but to polymers.

Patent EP 0,410,650 describes a method for the continuous preparation of prepolymers by the polycondensation of diamines and dicarboxylic acids. This method requires the evaporation of the water.

Furthermore, the formulation of the resulting batch requires an additional step which consists of compounding the resulting product by batch with one or more additives.

There is therefore a need to overcome the problems described above and one of the objectives of the present invention is to propose a method for preparing formulated polyamide prepolymers that is simpler, faster and more reliable, and less expensive than the methods from the prior art, and in a single step.

The present invention therefore relates to a method for the continuous preparation of a formulated polyamide prepolymer whose viscosity in solution is between 0.25 dL/g to 0.70 dL/g, as measured according to ISO 307:2007 in m-cresol at 20° C., characterized in that it comprises a step of polycondensation from one or more polyamide precursor monomers, said polycondensation step being carried out in a single extruder comprising at least two co-rotating conveying screws, said monomer(s) being previously added in solid or liquid form without dissolving in a solvent or in water, and said polycondensation step being carried out without extraction of by-products formed, especially water formed during said polycondensation, and comprising the addition of at least one additive during said polycondensation step in the extruder.

The Inventors have therefore found that a compromise between the residence time of the material in the extruder and the reaction temperature in the extruder could be found without requiring removal of the water, especially by placing the extruder under vacuum, in order to prepare a prepolymer of required viscosity and that, at the same time, this prepolymer could also be formulated during the polycondensation step in the extruder to lead to the formulated prepolymer.

Indeed, placing a prepolymer under vacuum in an extruder in order to remove the water is a technical difficulty since, because of the low viscosity, the medium tends to foam and to rise very easily in the vacuum line. This therefore causes clogging and loss of effectiveness of the vacuum.

Since the residence time is always the same in the extruder, the product formed therefore always has the same number average molar mass (Mn) or the same viscosity.

The product formed may also be characterized in line, which makes it possible by feedback to modify the method parameters in order to guarantee the proper control of the finished product.

Throughout the description, the term prepolymer has the same meaning as the term oligomer.

The term prepolymer denotes a polyamide having a number average molecular weight Mn of less than 10,000 g/mol, in particular from 1,000 to 9,000, in particular from 1,500 to 7,000, and more particularly from 2,000 to g/mol.

The Mn is determined in particular by calculation from the level of the terminal functions determined by potentiometric titration in solution and the functionality of said prepolymers or by NMR assay (Postma et al. Polymer, 47, 1899-1911 (2006)).

It may also be determined by size exclusion chromatography.

In the polymerization by polycondensation, and especially the polycondensation of diamine and dicarboxylic acid or else of a single monomer including both a carboxylic acid function and an amine function, each step is a condensation reaction which is carried out with elimination of small molecules, called reaction by-products, such as $H_2O$, depending on the monomers involved.

In the method of the invention, there is no elimination of the by-products formed and in particular of the water formed, which means that the extruder does not have any devices for discharging the reaction by-product(s) formed by the polycondensation reaction (which is water in the majority of cases).

The extruder especially does not have any degassing devices, in particular by adding an inert gas therein, or any device for removing the polycondensation by-product(s) formed, and especially of the water formed, made up of an outlet on the outside at atmospheric pressure, or of an outlet connected to a device with which to create a low-pressure zone in the extruder, such as a vacuum pump during the reaction.

The extruder is nevertheless equipped with a device for returning to atmospheric pressure after completion of the reaction and therefore after the screws.

The extruder used comprises two conveying screws.

The method for preparing a polyamide according to the invention includes the following successive steps, all carried out within the extruder: a step of mixing the selected monomer(s), and a polycondensation step carried out by performing shearing operations on the material conveyed by the conveying screws.

In a preferred manner, a step is also carried out of forming a continuously renewed cap or seal by conveying the material on the conveying screws, between the mixing and polycondensation steps. Advantageously, the cap or seal made up of the material in progress fills all the volume available for the passage of the material and constitutes a zone which is hermetically sealed to vapors, and especially to the monomer vapors that may be generated.

In an extruder, each conveying screw consists of different elements that follow one another in the direction of conveyance. These different elements are placed next to one another on a rotation shaft. In a co-rotating extruder all the conveying screws turn in the same direction, which usually corresponds to the counterclockwise direction. The elements are located next to one another in a single line in the case of a linear extruder, or in a circle in the case of an annular extruder. The different conveying screws constituting an extruder all have the same diameter which remains constant all along the conveying screw. Most often, this diameter belongs to the range from 18 to 134 mm.

Such an extruder is especially described in patent EP 2,877,516 with the exclusion of the elements for reduced pressure or for the extraction of the by-products formed which are not present in the method from the invention.

The monomers that are precursors of the polyamides are added in advance in solid or liquid form as a function of their natural appearance, but are in no case dissolved in any solvent or in water.

The expression "in advance" means that the monomers are added before any start of the polycondensation reaction.

In the context of the invention, the monomers are added, without prior reaction and without prior preparation of the corresponding salt.

Regarding the Polyamide

The nomenclature used to define polyamides is described in ISO 1874-1:2011 standard "Plastics—Polyamide (PA) Moulding And Extrusion Materials—Part 1: Designation" and is well known to a skilled person.

The polyamide may be any polyamide whether it is an aliphatic, cycloaliphatic, aromatic or semi-aromatic polyamide.

It may be a homopolyamide or copolyamide.

Advantageously, said polyamide is a homopolyamide.

Said aromatic polyamide is especially obtained from the polycondensation of an arylamine which may be selected from meta-xylylene diamine (MXD, CAS number: 1477-55-0) or para-xylylene diamine (PXD, CAS number: 539-48-0), with an aromatic dicarboxylic acid, in particular selected from terephthalic acid, isophthalic acid and naphthalenic acid.

Said semi-aromatic polyamide, optionally modified with urea units, may particularly be a semi-aromatic polyamide of formula X/YAr, as described in EP1,505,099, particularly a semi-aromatic polyamide of formula A/XT in which A is selected from a unit obtained from an amino acid monomer, a unit obtained from a lactam monomer and a unit corresponding to the formula (Ca diamine)·(Cb diacid), both representing monomers, with a representing the number of carbon atoms of the diamine and b representing the number of carbon atoms of the diacid, a and b each being between 4 and 36, advantageously between 9 and 18, the unit (Ca diamine) being selected from linear or branched aliphatic diamines, cycloaliphatic diamines and alkylaromatic diamines and the unit (Cb diacid) being selected from linear or branched aliphatic diacids, cycloaliphatic diacids and aromatic diacids;

X·T denotes a unit obtained from the polycondensation of a Cx diamine and terephthalic acid, with x representing the number of carbon atoms of the Cx diamine, x being between 6 and 36, advantageously between 9 and 18, especially a polyamide with formula A/6T, A/9T, A/10T or A/11T, A being as defined above, in particular a polyamide PA 6/6T, a PA 66/6T, a PA 6I/6T, a PA MPMDT/6T, a PA MXDT/6T, a PA PA11/10T, a PA 5T/10T, a PA 11/5T/10T, a PA 11/6T/10T, a PA MXDT/10T, a PA MPMDT/10T, a PA BACT/10T, a PA BACT/6T, PA BACT/10T/6T, a PA 11/BACT/10T, a PA 11/BACT/6T a PA 11/MPMDT/10T and a PA 11/MXDT/10T, and block copolymers, especially polyamide/polyether (PEBA).

T corresponds to terephthalic acid, MXD corresponds to m-xylylene diamine, MPMD corresponds to methylpentamethylene diamine and BAC corresponds to bis(aminomethyl)cyclohexane.

Said cycloaliphatic polyamide is especially obtained by the polycondensation of the following monomers: a cycloaliphatic diamine with an aliphatic dicarboxylic acid or an aliphatic diamine with a cycloaliphatic dicarboxylic acid or a cycloaliphatic diamine with a cycloaliphatic dicarboxylic acid.

The cycloaliphatic diamine may be selected for example from bis(3,5-dialkyl-4-aminocyclohexyl)-methane, bis(3,5-dialkyl-4-aminocyclohexyl)ethane, bis(3,5-dialkyl-4-aminocyclohexyl)-propane, bis(3,5-dialkyl-4-aminocyclohexyl)-butane, bis-(3-methyl-4-aminocyclohexyl)-methane or 3'-dimethyl-4,4'-diamino-dicyclohexyl-methane commonly called "BMACM" or "MACM" (and denoted B below), p-bis(aminocyclohexyl)-methane commonly called "PACM" (and denoted P below), isopropylidenedi(cyclohexylamine) commonly called "PACP", isophorone-diamine (denoted IPD below) and 2,6-bis(amino methyl) norbornane commonly called "BAMN."

A non-exhaustive list of these cycloaliphatic diamines is given in the publication "Cycloaliphatic Amines" (Encyclopaedia of Chemical Technology, Kirk-Othmer, 4th Edition (1992), pp. 386-405).

The cycloaliphatic dicarboxylic acid may comprise the following carbon backbones: norbornylmethane, cyclohexane, cyclohexylmethane, dicyclohexylmethane, dicyclohexylpropane, di(methylcyclohexyl) or di(methylcyclohexyl) propane.

The aliphatic diamine and the aliphatic dicarboxylic acid are such that for the aliphatic polyamide described below.

Said aliphatic polyamide may result from the polycondensation of one or more monomer(s) which is (are) at least one C6 to C18, particularly C6 to C12, more particularly C10 to C12 carboxylic acid, especially 11-aminoundecanoic acid.

Said aliphatic polyamide may be derived from the polycondensation of one or more monomer(s) which is (are) at least one C6 to C18, particularly C6 to C12, more particularly C10 to C12 lactam, especially lauryllactam.

Said aliphatic polyamide may come from the polycondensation of one or more monomer(s) which is (are) at least one C6 to C18, particularly C6 to C12, more particularly C10 to C12 aliphatic diamine, and at least one C6 to C18, particularly C6 to C12, more particularly C10 to C12, aliphatic dicarboxylic acid.

The aliphatic diamine used is an aliphatic diamine that has a linear main chain comprising at least 6 carbon atoms.

This linear main chain may, if necessary, include one or several methyl and/or ethyl substituents; in the latter configuration, this is called a "branched aliphatic diamine." In the case where the main chain does not include any substituent, the aliphatic diamine is called a "linear aliphatic diamine."

When this diamine is a linear aliphatic diamine, it particularly corresponds to the formula $H_2N—(CH_2)x-NH_2$ and may be selected for example from hexanediamine, heptanediamine, octanediamine, nonanediamine, decanediamine, undecanediamine, dodecanediamine, tridecanediamine, tetradecanediamine, hexadecanediamine and octadecenediamine. The linear aliphatic diamines that have just been mentioned can all be bio-sourced in the sense of standard ASTM D6866.

When this diamine is a branched aliphatic diamine, it may especially be 2-methyl-pentanediamine, 2-methyl-1,8-octanediamine or trimethylene (2,2,4 or 2,4,4)-hexanediamine.

The dicarboxylic acid may be selected from the linear or branched aliphatic dicarboxylic acids.

Advantageously, the diamine is a linear aliphatic diamine,

When the dicarboxylic acid is aliphatic and linear, it may be selected from adipic acid (6), heptanedioic acid (7), octanedioic acid (8), azelaic acid (9), sebacic acid (10), undecanedioic acid (11), dodecanedioic acid (12), brassylic acid (13), tetradecanedioic acid (14), hexadecanedioic acid (16), octadecanedioic acid (18), octadecenedioic acid (18).

Advantageously, the polyamide is a semi-aromatic, cycloaliphatic or semi-aromatic polyamide.

More advantageously, said polyamide is semi-aromatic or aliphatic, in particular said polyamide is aliphatic.

More advantageously, the polyamide is aliphatic and obtained from a single aminocarboxylic acid or from a single lactam, in particular it is obtained from 11-aminoundecanoic acid or lauryllactam, especially it is obtained from 11-aminoundecanoic acid.

Regarding the Additives

Said at least one additive is selected from catalysts, fillers, dyes, stabilizers, especially light stabilizers, particularly UV and/or heat stabilizers, plasticizers, surfactants, nucleating agents, pigments, whiteners, antioxidants, lubricants, flame retardants, natural waxes, and mixtures thereof.

One or more pigments or dyes may be given as examples of additives.

The pigment may in principle be selected freely from among the pigments used in conventional manner. It may especially be selected from mineral pigments such as titanium dioxide, carbon black, cobalt oxide, nickel titanate, molybdenum disulfide, aluminum flakes, iron oxides, zinc oxide, zinc phosphate, and organic pigments, such as phthalocyanine and anthraquinone derivatives.

The dye may also be of any type known to those skilled in the art. Mention may in particular be made of azo dyes, anthraquinone dyes, indigo dyes, triarylmethane dyes, chlorine dyes and polymethine dyes.

Mention may also be made of one or more additives which are selected from the group consisting of catalysts, anti-crater agents or spreading agents, reducers, antioxidants, reinforcing fillers, UV stabilizers, fluidization agents, corrosion inhibitors, or mixtures thereof.

The anti-crater and/or spreading agent may be of any type known to those skilled in the art. Preferably, the anti-crater and/or spreading agent is selected from the group consisting of polyacrylate derivatives.

The UV stabilizer may be of any type known to those skilled in the art. Preferably, the UV stabilizer is selected from the group consisting of resorcin derivatives, benzotriazoles, phenyltriazines and salicylates.

The antioxidants may be of any type known to those skilled in the art. Preferably, the antioxidants are selected from the group consisting of copper iodide combined with potassium iodide, phenol derivatives and hindered amines.

The fluidizing agent may be of any type known to those skilled in the art. Preferably, the fluidizing agent is selected from the group consisting of aluminas and silicas.

Corrosion inhibitors may be of any type known to those skilled in the art. Preferably, corrosion inhibitors are selected from the group consisting of phosphosilicates and borosilicates.

The term "catalyst" denotes a polycondensation catalyst such as a mineral or organic acid.

Advantageously, the catalyst is selected from phosphoric acid (H3PO4), phosphorous acid (H3PO3), hypophosphorous acid (H3PO2), or one of its salts such as sodium hypophosphite, which is sold in its monohydrate form or another of its salts, such as salts of calcium, lithium, magnesium, potassium, vanadium, zinc, manganese, tin, titanium, zirconium, antimony, germanium, aluminum and ammonium, or a mixture thereof.

At least one additive is added into the extruder and its added proportion is a function of the type of additives.

The additives are preferably present in a quantity by mass, relative to the total sum of the weights of the monomers and of the additives added, from 1 to 30%, more preferentially from 2 to 10%, even more preferentially from 3 to 5%, for example from 0 to 5%, or from 5 to 10%, or from 10 to 15%, or from 15 to 20%, or from 20 to 25%, or from 25 to 30%.

If the additive is a catalyst, the proportion by weight of catalyst is included from about 50 ppm to about 20,000 ppm, in particular from about 100 to about 10,000 ppm, more particularly from 1,000 to 10,000 ppm relative to the total sum of the weights of the monomers and additives added.

In an Embodiment

Regarding the Method

Preferably, the average degree of polymerization (DPn) of the polyamide obtained according to the method from the invention is less than in particular less than or equal to 45, in particular between 5 and 45.

Advantageously, the average degree of polymerization (DPn) of the polyamide obtained according to the method of the invention is from 8 to 40, in particular from 12 to 30.

The term "average degree of polymerization (DPn)" means the average number of structural units present in a polymer chain. The average degree of polymerization (DPn) is typically evaluated from the number average molecular weight (Mn) of the polyamide according to the following formula:

$$DPn=Mn/M_0 \hspace{2cm} \text{[Math 1]}$$

With

Mn the number average molecular weight of the polyamide $M_0$ the number average molecular weight of the monomers Advantageously, the weight average molecular weight (Mn) of the polyamide obtained according to the method of the invention is less than 10,000 g/mol, in particular between 1,000 and 9,000, in particular from 1,500 to 7,000, more particularly from 2,000 to 5,000 g/mol.

The weight-average molecular weight may be determined by size exclusion chromatography.

In one embodiment, said extruder comprises two to twelve co-rotating conveying screws.

In a first variant of this embodiment, said extruder is a twin-screw extruder comprising two co-rotating conveying screws.

Advantageously, in this first variant, said method is carried out at a temperature between 220 and 340° C., preferentially from 260 to 300° C.

In one embodiment of this first variant, the residence time of the material in the extruder at the temperature comprised between 220 and 340° C. allows executing the polycondensation reaction so as to arrive at the desired average degree of polymerization.

Advantageously, the desired degree of polymerization is comprised from 8 to 40, in particular from 12 to 30.

In one embodiment of this first variant, the residence time of the material in the extruder at the temperature comprised from 220 to 340° C. allows executing the polycondensation reaction so as to arrive at the desired viscosity between 0.25 and 0.7 dL/g.

In a second variant of this embodiment, said extruder is an annular multi-screw extruder comprising at least 6 conveying screws, in particular 12 conveying screws, that are co-rotating.

In one embodiment of this second variant, the residence time of the material in the extruder at the temperature comprised from 220 to 340° C. allows executing the polycondensation reaction so as to arrive at the desired average degree of polymerization.

Advantageously, the desired degree of polymerization is comprised from 8 to 40, in particular from 12 to 30.

In one embodiment of this second variant, the residence time of the material in the extruder at the temperature comprised from 220 to 340° C. allows executing the polycondensation reaction so as to arrive at the desired viscosity between 0.25 and 0.7 dL/g.

Advantageously, the residence time of the material in the extruder of the first or second variant is greater than or equal to 1 minute, and especially comprised from 1 to 10 minutes, in particular comprised from 2 to 6 minutes.

In another embodiment of one or the other of the two variants, the flow rate of the extruder is greater than or equal to 10 kg/h, especially greater than or equal to 15 kg/h, in particular greater than or equal to 30 kg/h, more particularly greater than or equal to 50 kg/h.

Advantageously, the extruder used with a flow rate greater than or equal to 10 kg/h, especially greater than or equal to 15 kg/h, in particular greater than or equal to 30 kg/h, more particularly greater than or equal to 50 kg/h, is an extruder comprising six to twelve co-rotating conveying screws, in particular twelve co-rotating conveying screws.

In one embodiment, the length of the extruder comprising six to twelve co-rotating conveying screws, especially twelve co-rotating conveying screws with the flow described above is greater than or equal to 30 L/D, in particular from 30 to 100 L/D.

In the method of the invention, at least one additive is added during the polycondensation in the extruder. The at least one additive may be added in the addition zone of the monomer(s), or in a subsequent work zone, or even in two areas, for example, in the addition zone of the monomer(s), then in a subsequent work zone.

When several additives are added, each additive can be added according to the methods defined above.

In one embodiment of the method according to the invention, an in-line analysis is carried out during said method.

In a first variant of this latter embodiment, if the in-line analysis characterizes a resulting product having the required characteristics and especially the desired degree of polymerization, then the operating parameters of the method, especially the residence time and temperature pair of the extruder, are not modified.

In a second variant of this latter embodiment, if the in-line analysis characterizes a resulting product that does not have the required characteristics and especially the desired degree of polymerization, then the operating parameters of the method, especially the residence time and temperature pair of the extruder, are modified to make it possible to obtain a product having the required characteristics and especially the desired degree of polymerization.

In one embodiment, said at least one additive is added in said single extruder in the main hopper.

Advantageously, said at least one additive is selected from catalysts, fillers, dyes, and stabilizers.

In another embodiment, said at least one additive is added in said single extruder after the main hopper.

Advantageously, said at least one additive is selected from phosphoric acid and phosphorous acid.

In yet another embodiment, at least one additive is added in said single extruder in the main hopper and at least one additive is added in said single extruder after the main hopper.

Advantageously, said at least one additive added in the main hopper is selected from catalysts, fillers, dyes, stabilizers and said additive added after the main hopper is selected from phosphoric acid and phosphorous acid.

According to another aspect, the present invention relates to the formulated product which could be obtained by the method as defined above.

The formulated product therefore corresponds to the formulated polyamide prepolymer obtained by the method defined above.

According to another aspect, the present invention relates to an extruder suited for implementing the method as defined above.

EXAMPLES

Example 1 (Comparative)

Representative example of the preparation of a formulated aliphatic polyamide

A PA11 prepolymer formulated with $H_3PO_2$ was prepared in two steps:

a first step per batch process for the preparation of the prepolymer:

To a 14 liter autoclave reactor, 5 kg of the following raw materials are added:

500 g water, the diamine and the dicarboxylic acid and/or the amino acid, 0.1 g of a WACKER AK1000 antifoam agent (from Wacker Silicones).

The closed reactor is purged of its residual oxygen then heated to a material temperature of 230° C. After 30 minutes of stirring under these conditions, the pressurized vapor that formed in the reactor is relaxed progressively over 60 minutes, while progressively adjusting the temperature of the material such that it stabilizes at Tf+10° C. at atmospheric pressure.

The oligomer (prepolymer) is then emptied through the bottom valve then cooled in a water bath then milled.

A PA11 prepolymer of Mn=3000 and viscosity 0.40 was prepared, without the use of diamine or dicarboxylic acid, from 11-aminoundecanoic acid (CAS 2432-99-7), according to this procedure with a residence time much longer (more than one hour) than that of the method described in examples 2 and 3 of the invention (between 1 and 5 minutes), then a second compounding step with the $H_3PO_2$ additive in aqueous solution (8000 ppm of $H_3PO_2$) in an Evolum32HT twin-screw extruder (EV32 Clextral) with a diameter D=32 mm (length=40D)

Example 2 (Invention)

A formulated PA11 prepolymer was prepared from solid state 11-aminoundecanoic acid (CAS 2432-99-7) on an EV32 twin-screw extruder (Clextral) with a diameter D=32 mm (length=40D) without extraction of the by-products formed during the polycondensation, and addition of $H_3PO_2$ in aqueous solution (8,000 ppm of $H_3PO_2$) in the main hopper or after the main hopper (Tables 1 and 2).

TABLE 1

| | Formulation PA11 + $H_3PO_2$ | | | | |
| --- | --- | --- | --- | --- | --- |
| $H_3PO_2$ | 8,000 ppm in main hopper | 8,000 ppm after main hopper | | | |
| Flow rate (kg/h) | 12 | 12 | | 9 | |
| Screw speed (rpm) | 300 | 300 | | 225 | |
| Temperature | 290 | 280 | 300 | 280 | 300 |
| Viscosity in solution ISO 307: 2007 (m-cresol at 20° C.) | 0.41 | 0.27 | 0.38 | 0.35 | 0.53 |

TABLE 2

| Temperature Profile | |
| --- | --- |
| 280 = | 20/150/250/280/280/280/280/280/280/280-260 |
| 290 = | 20/150/250/290/290/290/290/290/290/290-260 |
| 300 = | 20/100/200/300/300/300/300/300/300/300-260 |

Example 3 (Invention)

A formulated PA11 prepolymer was prepared from solid state 11-aminoundecanoic acid (CAS 2432-99-7) on an EV32 twin-screw extruder (Clextral) with a diameter D=32 mm (length=40D) without extraction of the by-products formed during the polycondensation, and addition of $H_3PO_4$ in aqueous solution (5,300 ppm of $H_3PO_4$) in the main hopper or after the main hopper (Tables 3 and 4).

TABLE 3

| | Formulation PA11 + $H_3PO_4$ | | | | |
| --- | --- | --- | --- | --- | --- |
| $H_3PO_4$ | 5,300 ppm in main hopper | 5,300 ppm after main hopper | | | |
| Flow rate (kg/h) | 12 | 12 | | 9 | |
| Screw speed (rpm) | 300 | 300 | | 225 | |
| Temperature | 280 | 280 | 290 | 300 | 280 |
| Visco | 0.42 | 0.40 | 0.57 | 0.66 | 0.52 |

TABLE 4

| Temperature Profile | |
| --- | --- |
| 280 = | 20/150/250/280/280/280/280/280/280/280-260 |
| 290 = | 20/150/250/290/290/290/290/290/290/290-260 |
| 300 = | 20/100/200/300/300/300/300/300/300/300-260 |

Examples 2 and 3 show that a formulated PA11 may be obtained in a single step by the continuous method of the invention with the required viscosity characteristics.

Furthermore, the formulated products resulting from the method of the invention are comparable to those resulting from the batch process with regard to several points such as viscosity in solution, grinding ability, shaping and mechanical properties of the resulting product.

The invention claimed is:

1. A method for the continuous preparation of a formulated polyamide prepolymer, the formulated polyamide prepolymer having a viscosity in solution of which is comprised from 0.25 dL/g to 0.70 dL/g, as measured according to ISO 307:2007 in m-cresol at 20° C., said the formulated polyamide prepolymer having a weight average molecular weight (Mn) less than 10,000 g/mol as determined by calculation from the level of terminal functions determined by potentiometric titration in solution and the functionality of said the prepolymers or by NMR assay or by size exclusion chromatography, wherein the method comprises a step of polycondensation from one or several polyamide precursor monomers, said the polycondensation step being carried out in a single extruder comprising at least two co-rotating conveying screws, said the monomer(s) being previously added in solid or liquid form without dissolving in a solvent or in water, and said the polycondensation step being carried out without extraction of the by-products formed, and comprising the addition of at least one additive during said the polycondensation step in the extruder, said the extruder not having any degassing devices, or any device for removing the polycondensation by-product (s) formed, and the water formed, consisting of an outlet on the outside at atmospheric pressure, or of an outlet connected to a device making it possible to create a low-pressure zone in the extruder, such as a vacuum pump during the reaction.

2. The method according to claim 1, wherein an average degree of polymerization (DPn) of the resulting formulated polyamide prepolymer is less than 50, as determined from the number average molecular weight (Mn) of the formulated polyamide prepolymer according to the following formula:

$$DPn=Mn/M_0 \hspace{2cm} \text{[Formula 1]}$$

with

Mn being the number average molecular weight of the formulated polyamide prepolymer, and $M_0$ being the number average molecular weight of the monomers.

3. The method according to claim 1, wherein the formulated polyamide prepolymer is an aliphatic polyamide.

4. The method according to claim 3, wherein the monomer(s) is (are) at least one C6 to C18 monomer.

5. The method according to claim 3, wherein the monomer(s) is (are) at least one C6 to C18 C12 monomer.

6. The method according to claim 3, wherein the monomer(s) is (are) at least one C6 to C18 C10-C12 monomer.

7. The method according to claim 2, wherein the extruder is a twin-screw extruder with two co-rotating conveying screws.

8. The method according to claim 7, wherein the polycondensation step is carried out at a temperature comprised from 220 to 340° C.

9. The method according to claim 8, wherein the residence time of material in the extruder at the temperature comprised from 220 to 340° C. makes it possible to execute the polycondensation reaction so as to arrive at the desired average degree of polymerization, said the residence time being greater than or equal to 1 minute.

10. The method according to claim 2, wherein the extruder is an annular multi-screw extruder comprising at least 6 screws.

11. The method according to claim 10, wherein the residence time of the material in the extruder at the temperature comprised from 220 to 340° C. makes it possible to execute the polycondensation reaction so as to arrive at the desired average degree of polymerization, said the residence time being greater than or equal to 1 minute.

12. The method according to claim 7, wherein the residence time of the material in the extruder is greater than or equal to 1 minute.

13. The method according to claim 1, wherein said the at least one additive is selected from catalysts, fillers, dyes, stabilizers, plasticizers, surfactants, nucleating agents, pigments, whiteners, antioxidants, lubricants, flame retardants, natural waxes, and mixtures thereof.

14. The method according to claim 1, wherein the single extruder comprises a main hopper, wherein said the at least one additive is added to said the single extruder in the main hopper.

15. The method according to claim 1, wherein the single extruder comprises a main hopper, wherein said the at least one additive is added to said the single extruder after the main hopper.

* * * * *